United States Patent
Baik

(10) Patent No.: US 10,152,803 B2
(45) Date of Patent: Dec. 11, 2018

(54) MULTIPLE VIEW IMAGE DISPLAY APPARATUS AND DISPARITY ESTIMATION METHOD THEREOF

(71) Applicant: SAMSUNG ELECTRONICS CO., LTD., Suwon-si (KR)

(72) Inventor: Aron Baik, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 14/744,762

(22) Filed: Jun. 19, 2015

(65) Prior Publication Data
US 2016/0014387 A1 Jan. 14, 2016

(30) Foreign Application Priority Data
Jul. 10, 2014 (KR) .................. 10-2014-0086685

(51) Int. Cl.
*H04N 13/139* (2018.01)
*G06T 7/00* (2017.01)
*H04N 13/398* (2018.01)
*H04N 13/351* (2018.01)
*H04N 13/00* (2018.01)
*H04N 13/305* (2018.01)
*H04N 13/31* (2018.01)

(52) U.S. Cl.
CPC ............ *G06T 7/97* (2017.01); *H04N 13/139* (2018.05); *H04N 13/351* (2018.05); *H04N 13/398* (2018.05); *G06T 2207/10012* (2013.01); *G06T 2207/20016* (2013.01); *G06T 2207/20021* (2013.01); *G06T 2207/20228* (2013.01); *H04N 13/305* (2018.05); *H04N 13/31* (2018.05); *H04N 2013/0081* (2013.01)

(58) Field of Classification Search
None
See application file for complete search history.

(56) References Cited

U.S. PATENT DOCUMENTS 9,161,010 B2 10/2015 Ali et al.
9,652,853 B2 5/2017 Matono et al.
(Continued)

FOREIGN PATENT DOCUMENTS

CN 101840517 A 9/2010
CN 103139469 A 6/2013
(Continued)

OTHER PUBLICATIONS

Communication issued by the State Intellectual Property Office of P.R. China dated Nov. 16, 2017 in counterpart Chinese Patent Application No. 201510404499.7.
(Continued)

*Primary Examiner* — Jayanti K Patel
*Assistant Examiner* — Shadan E Haghani
(74) *Attorney, Agent, or Firm* — Sughrue Mion, PLLC

(57) ABSTRACT

A method of estimating a disparity in a multiview image display apparatus includes performing image scaling on an image frame based on a resolution corresponding to the image frame; determining at least one from among a search range and precision of a matching block for the scaled image frame according to the resolution; and estimating a disparity of the image frame by using the at least one from among the search range and the precision of the matching block.

15 Claims, 12 Drawing Sheets

(56) References Cited

U.S. PATENT DOCUMENTS

| | | | |
|---|---|---|---|
| 9,684,964 B2 | 6/2017 | Nakatani et al. | |
| 9,710,923 B2 | 7/2017 | Ohba et al. | |
| 2008/0002878 A1* | 1/2008 | Meiyappan | G06K 9/32 382/154 |
| 2010/0128974 A1 | 5/2010 | Koizumi et al. | |
| 2010/0201789 A1* | 8/2010 | Yahagi | H04N 13/0029 348/51 |
| 2012/0033051 A1* | 2/2012 | Atanassov | H04N 13/0239 348/49 |
| 2013/0010057 A1 | 1/2013 | Borel et al. | |
| 2013/0057644 A1* | 3/2013 | Stefanoski | G06T 5/50 348/42 |
| 2013/0142415 A1 | 6/2013 | Ali et al. | |
| 2013/0170736 A1 | 7/2013 | Guo et al. | |
| 2013/0187910 A1* | 7/2013 | Raymond | G09G 5/14 345/419 |
| 2014/0002616 A1 | 1/2014 | Ohba et al. | |
| 2014/0098100 A1 | 4/2014 | Dane et al. | |
| 2014/0119663 A1* | 5/2014 | Barnum | G06K 9/6215 382/192 |
| 2014/0240516 A1* | 8/2014 | Kolarov | H04N 5/265 348/180 |
| 2014/0294289 A1* | 10/2014 | Nakatani | G06T 7/0075 382/154 |
| 2015/0124062 A1* | 5/2015 | Didyk | H04N 13/0011 348/51 |
| 2015/0310621 A1 | 10/2015 | Matono et al. | |
| 2016/0328828 A1 | 11/2016 | Zhang et al. | |

FOREIGN PATENT DOCUMENTS

| | | |
|---|---|---|
| CN | 103220545 A | 7/2013 |
| CN | 103430210 A | 12/2013 |
| CN | 103810685 A | 5/2014 |
| CN | 104079912 A | 10/2014 |
| JP | 2014-90233 A | 5/2014 |
| KR | 1020060132280 A | 12/2006 |
| KR | 1020130142008 A | 12/2013 |

OTHER PUBLICATIONS

Communication dated Jun. 19, 2018, issued by the State Intellectual Property Office of the People's Republic of China in counterpart Chinese Patent Application No. 201510404499.7.

\* cited by examiner

100

MULTIPLE VIEW IMAGE DISPLAY APPARATUS AND DISPARITY ESTIMATION METHOD THEREOF

CROSS-REFERENCE TO RELATED APPLICATION

This application claims priority from Korean Patent Application No. 10-2014-0086685, filed on Jul. 10, 2014, in the Korean Intellectual Property Office, the disclosure of which is incorporated herein by reference in its entirety.

BACKGROUND

1. Field

Apparatuses and methods consistent with exemplary embodiments relate to a multiple view (or multiview) image display apparatus and a display parity estimation method thereof, and more particularly, to a multiview image display apparatus using dynamic cost volume sampling, and a disparity estimation method thereof.

2. Description of the Related Art

With the development of electronic technology, various types of electronic apparatuses have been developed. In particular, display apparatuses such as televisions (TVs) which are commonly used home appliances have been developed rapidly in recent years.

With high performance of the display apparatuses, various types of content are displayed on the display apparatus. In particular, stereoscopic display systems capable of displaying three-dimensional (3D) content have been developed in recent years.

The stereoscopic display apparatuses may be implemented in various types of display apparatuses such as a monitor, a portable phone, a personal digital assistant (PDA), a personal computer (PC), a set-top PC, a tablet PC, an electronic photo frame, or a kiosk, in addition to a 3D TV. Further, 3D display technology may be used in home appliances as well as in various fields that perform 3D imaging such as a field of science, medicine, design, education, advertising, and/or a computer game.

The stereoscopic display systems may typically include autostereoscopic systems capable of displaying 3D images without a need for glasses and stereoscopic systems capable of displaying 3D images with the need for glasses.

Although the stereoscopic system may provide a satisfactory 3D effect, it may be inconvenience for a viewer to wear glasses to view 3D images. On the other hand, the autostereoscopic system may display 3D images without the need for glasses, and thus a research on the development of the autostereoscopic system has been continuously conducted.

A multiview image is needed in the autostereoscopic 3D display. However, image conversion is required when an input image is a stereoscopic image. The stereoscopic image is a 3D image (or 3D video image) which is represented by using a left-eye image and a right-eye image, and is captured by a stereoscopic imaging apparatus. Disparity estimation between the left-eye image and the right-eye image is important in performing image conversion.

In a stereoscopic image having a wide disparity width, a search range is an important factor in performing disparity estimation. In contrast, in a stereoscopic image having a narrow disparity width, precision is an important factor in performing disparity estimation. The wider the search range is and/or the narrower the sampling interval is, the more increased complexity a disparity estimation algorithm has. Disparity estimation algorithms typically use a cost volume. The cost volume is a function of the disparity and X and Y coordinate values of the stereoscopic image.

In the related art constant volume sampling, the search range and precision are fixed. To increase the search range and/or precision, algorithm complexity needs to increase. Therefore, under the condition of a preset cost volume size, that is, preset algorithm complexity, a wider search range and/or higher precision may not be provided.

SUMMARY

One or more exemplary embodiments provide a disparity estimation method and a multiview image display apparatus, which are capable of increasing a search range and/or precision through dynamic cost volume sampling while maintaining the same cost volume size.

According to an aspect of an exemplary embodiment, there is provided a method of estimating a disparity in a multiview image display apparatus, the method including: performing image scaling on an image frame based on a resolution corresponding to the image frame; determining at least one from among a search range and precision of a matching block for the scaled image frame according to the resolution corresponding to the image frame; and estimating a disparity of the image frame by using the at least one from among the search range and the precision of the matching block.

The performing may include determining the resolution corresponding to the image frame as being a lowest resolution in response to the image frame being a first image frame among input image frames; and determining the resolution corresponding to the image frame by analyzing a disparity of a previous image frame in response to the image frame being not the first image frame.

The determining the resolution may include analyzing the disparity of the previous image frame by using a disparity histogram, and determining the resolution corresponding to the image frame based on a resolution corresponding to the previous image frame according to a result of the analyzing.

The method may further include: determining whether a screen is to be converted, wherein the performing the image scaling includes determining the resolution corresponding to the image frame as a lowest resolution in response to determining that the screen is to be converted.

The performing the image scaling may include performing image scaling by using at least one from among an isomorphic image sampling method and an anamorphic image sampling method.

The determining the at least one from among the search range and the precision of the matching block may include determining the at least one from among the search range and the precision of the matching block by using a size of a cost volume.

The estimating the disparity of the image frame may include: measuring correlation values between a reference block and searched matching blocks, and estimating the disparity based on a difference between positions of the reference block and a matching block having a highest correlation value.

According to an aspect of another exemplary embodiment, there is provided a multiview image display apparatus including: an image scaler configured to perform image scaling on an image frame based on a resolution corresponding to the image frame; a determiner configured to determine at least one from among a search range and precision of a matching block for the scaled image frame according to the resolution corresponding to the image frame; and a disparity estimator configured to estimate a disparity of the image frame by using the at least one from among the search range and the precision of the matching block.

The image scaler may determine the resolution corresponding to the image frame as being a lowest resolution in response to the image frame being a first image frame among input image frames, and determine the resolution corresponding to the image frame by analyzing a disparity of a previous image frame in response to the image frame being not the first image frame.

The image scaler may analyze the disparity of the previous image frame by using a disparity histogram, and determine the resolution corresponding to the image frame based on a resolution corresponding to the previous image frame according to a result of the analyzing.

The multiview image display apparatus may further include: a screen conversion determiner configured to determine whether a screen is to be converted, wherein the image scaler is configured to determine the resolution corresponding to the image frame as being a lowest resolution in response to determination that the screen is to be converted.

The image scaler may perform image scaling by using at least one from among an isomorphic image sampling method and an anamorphic image sampling method.

The determiner may determine the at least one from among the search range and precision of the matching block by using a size of a cost volume.

The disparity estimator may measure correlation values between a reference block and searched matching blocks, and estimate the disparity based on a difference between positions of the reference block and a matching block having a highest correlation value.

According to an aspect of still another exemplary embodiment, there is provided a display apparatus including: a display; and a controller configured to control the display to display a multiview image based on a disparity and depth information of an input image frame, wherein the controller is configured to control a resolution of the input image frame, and estimate the disparity by searching for a matching block based on the controlled resolution of the input image frame.

The controller may include an image scaler configured to perform image scaling on the input image frame to have a resolution determined by the controller.

The controller may analyze a disparity of a previous image frame and control the resolution of the input image frame according to a result of the analysis.

When it is determined that a search range of the matching block needs to increase according to the result of the analysis, the controller may control a resolution of a current image frame to reduce from a resolution of the previous image frame, and when it is determined that precision of the matching block needs to increase according to the result of the analysis, the controller may control the resolution of the current image frame to increase from the resolution of the previous image frame.

The controller may maintain a constant size of a cost volume in estimating the disparity.

According to an aspect of an exemplary embodiment, there is provided a non-transitory computer-readable recording medium storing a program including instructions, which, when executed by a computer, performs the above method.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will become more apparent by describing certain exemplary embodiments, with reference to the accompanying drawings, in which.

DETAILED DESCRIPTION

Figure 1:
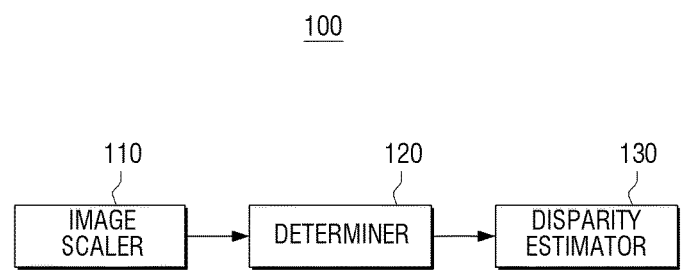
FIG. 1 is a schematic block diagram illustrating a configuration of a multiview image display apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a schematic block diagram illustrating a configuration of a multiview image display apparatus according to an exemplary embodiment.

Referring to FIG. 1, a multiview image display apparatus 100 includes an image scaler 110, a determiner 120, and a disparity estimator 130. Some or all of the above described elements may be included in a controller (not shown) that controls an overall operation of the multiview image display apparatus. For example, the controller may be a processor. Some or all of the above elements may be embodied by hardware, software, or a combination of hardware and software.

The multiview image display apparatus 100 may be implemented in various types of display apparatuses such as, for example, a television (TV), a monitor, a personal computer (PC), a kiosk, a tablet PC, an electronic photo frame, or a portable phone.

The image scaler 110 determines resolution corresponding to an image frame and performs image scaling on the image frame based on the determined resolution. Since a search range and/or precision for disparity estimation are determined according to resolution of a sampled image, the image scaling needs to be performed based on resolution that corresponds to a desired search range and/or precision.

The determiner 120 determines a search range and precision for a matching block with respect to an image frame that is scaled by the image scaler 110 according to the determined resolution. That is, dynamic cost volume sampling is performed by the image scaler 110 and the determiner 120. Without changing a preset cost volume size, the search range may be expanded in response to a low-resolution image being used, and the precision may be increased in response to a high-resolution image being used.

The disparity estimator 130 estimates a disparity of the image frame using the search range and precision of the matching block determined by the determiner 120. The disparity may be estimated through various methods. For example, the matching blocks may be determined based on the search range and precision, correlation values between a reference block and the matching blocks may be measured, and the disparity may be determined based on a location difference between a matching block having the highest correlation value and the reference block.

By using the above-described multiview image display apparatus 100, the user may increase the search range and/or precision of the matching block as needed without increasing algorithm complexity, and may estimate the disparity for an autostereoscopic 3D display.

Figure 2:
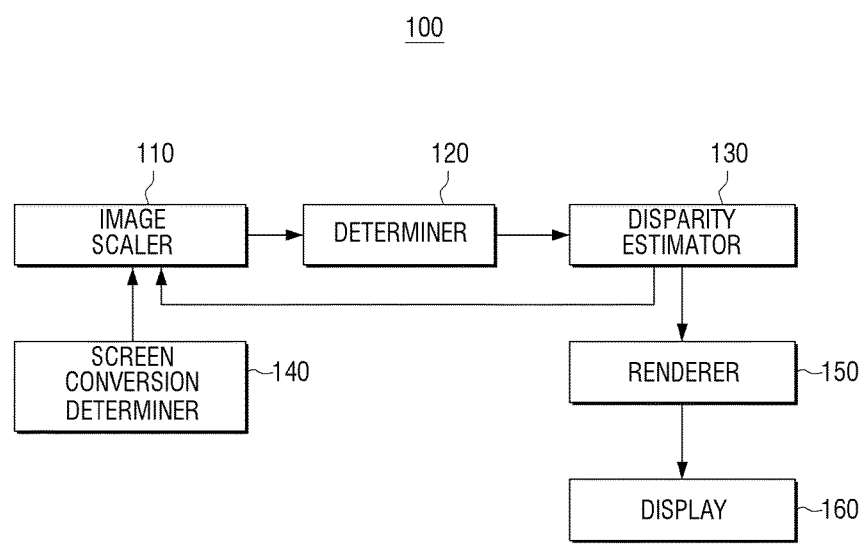
FIG. 2 is a detailed block diagram illustrating a configuration of a multiview image display apparatus according to an exemplary embodiment.

FIG. 2 is a detailed block diagram illustrating a configuration of a multiview image display apparatus 100 according to an exemplary embodiment.

Referring to FIG. 2, the multiview image display apparatus 100 includes an image scaler 110, a determiner 120, a disparity estimator 130, a screen conversion determiner 140, a renderer 150, and a display 160.

An image input unit (not shown) receives an image. Specifically, the image input unit may receive the image from various external apparatuses such as an external storage medium, a broadcasting station, or a web server. In an exemplary embodiment, a method of receiving a stereoscopic image and estimating a disparity for conversion to a multiview image will be described. The stereoscopic image is a 3D video image represented by using a left-eye image and a right-eye image, and is captured through a stereoscopic imaging apparatus. The stereoscopic imaging apparatus may include two lenses and generate the 3D image. A multiview image means a 3D image (or 3D video image) which provides various viewing points in various directions to the user through geometric correction and spatial synthesis on images captured by one or more imaging apparatuses (e.g., camera).

Further, the image input unit may receive depth information of a 3D image. The depth of the 3D image is represented as a pixel value assigned to each pixel of the 3D image. For example, an 8-bit depth value may correspond to gray scale values of 0 to 255. For example, the black (or a low gray scale value) represents a location further away from the viewer, and the white (or a high gray scale value) represents a location closer to the viewer.

The depth information is information indicating a depth of a 3D image, and corresponds to a degree of a binocular disparity between a left-eye image and a right-eye image constituting the 3D image. A degree of a 3D effect felt by the viewer is changed according to the depth information. In response to a greater depth of the 3D image, the binocular disparity is increased, and the 3D effect is increased. In response to a smaller depth of the 3D image, the binocular disparity is reduced, and the 3D effect is decreased. The depth information may be acquired through a passive method using only 2D characteristics of an image such as stereo matching and/or an active method using equipment such as a depth camera. The depth information may have a form of a depth map.

The depth map means a table including pieces of depth information according to regions of an image. The regions may be divided into pixel units, and may be defined as a preset region larger than the pixel unit. According to an exemplary embodiment, the depth map may be configured such that a pixel value smaller than 127 (or 128) as a negative (−) value and a value equal to or larger than 127 (or 128) as a positive (+) value by using a gray scale value of 127 (or 128) among the gray scale values of 0 to 255 as a reference value of a focal plane. The reference value of the focal plane may be arbitrarily selected between 0 and 255. In the depth map, the negative (−) value means recess and the positive (+) value means protrusion.

The stereo matching method searches for matching points between the left-eye image and the right-eye image, and calculates the depth information using the disparity between the matching points. To this end, various stereo matching techniques, for example, an image correlation technique may be used. The image correlation technique searches for matching blocks of the right-eye image (or the left-eye image) for which correlation with a reference block of the left-eye image (or the right-eye image) is determined, and detects a location of a matching block in the right-eye image having the highest correlation value with respect to the reference block of the left-eye image. At this time, a distance difference on an x-axis (or a horizontal axis) between the matching points of the left-eye image and the right-eye image is referred to as a disparity.

The image scaler 110 determines resolution corresponding to the image frame, and performs image scaling on the image frame according to the determined resolution. An image sampling method and a resolution determining method used in the image scaling will be described later.

The determiner 120 determines a search range and precision of the matching block for the scaled image frame. In an exemplary embodiment, the determiner 120 determines the search range and precision of the matching block by using a preset size of a cost volume size.

Since the constant cost volume sampling method is used in the related art, the disparity search range and precision are determined to have a fixed value in response to the cost volume size being determined. However, according to an exemplary embodiment, the above problem may be avoided, which will be described in detail below.

Figure 3:
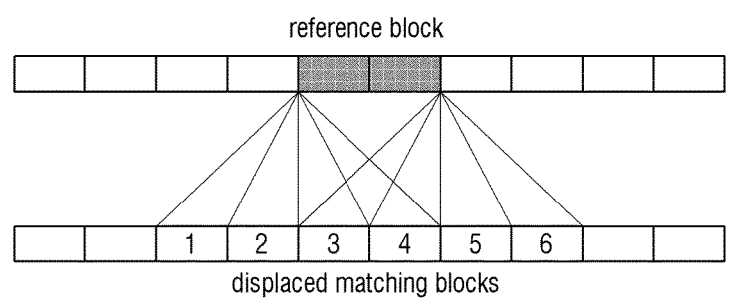
FIG. 3 is a view for explaining a constant cost volume sampling method.

FIG. 3 is a view illustrating a search range and precision in the constant cost volume sampling method in response to a cost volume size being five.

Referring to FIG. 3, one of the left-eye image and the right-eye image may be defined as a reference image. For example, in response to a reference block being formed in the left-eye image, the matching block may be searched for in the right-eye image. On the other hand, in response to the reference block being formed in the right-eye image, the matching block may be formed in the left-eye image. For example, since the cost volume size is five, five matching blocks corresponding to a 2×2 reference block are formed. The five matching blocks include blocks 1-2, blocks 2-3, blocks 3-4, blocks 4-5, and blocks 5-6. The search range is in a range from block 1 to block 6. In the related art, when the cost volume size is not changed, the determined search range and/or precision may not be changed.

According to an exemplary embodiment, the search range and/or precision of the matching block may be changed according to the resolution of the image frame by using the dynamic cost volume sampling method instead of the constant cost volume sampling method. The search range and the precision have a trade-off relationship in which the precision is reduced in response to the search range being expanded, and the precision is increased in response to the search range being narrowed. That is, even in response to the cost volume size being a preset size, the search range may be increased by reducing the precision or vice versa through the dynamic cost volume sampling.

Figure 4A:
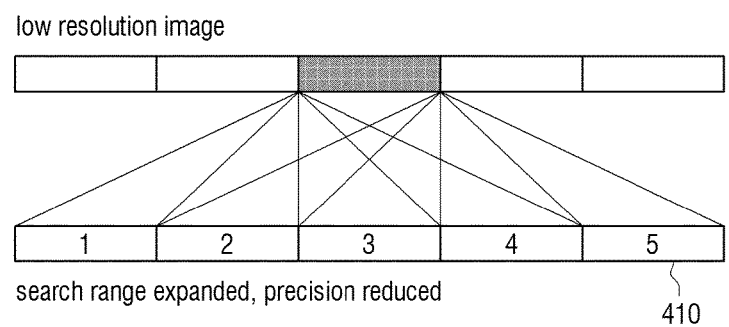
FIG. 4A to 4C are views for explaining a dynamic cost volume sampling method.

Therefore, when a search range needs to increase, the image scaling may be performed on a low-resolution image frame, and the search range may be expanded as illustrated in FIG. 4A. Referring to FIG. 4A, the search range includes an entire section of an image 410. That is, the five matching blocks of the image 410 include block 1, block 2, block 3, block 4, and block 5. The cost volume size is also five, however, the matching blocks block 1 to block 5 have a wider search range since the size of the matching block is 1×1. However, while the matching block has a wider search range, the matching block has a lower precision level.

Figure 4B:
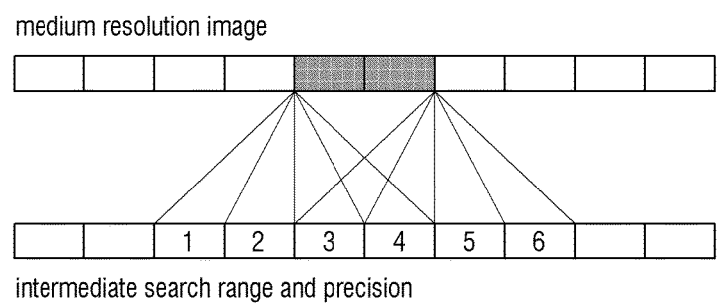

In a case where a medium search range and a medium degree of precision is needed, the image scaling may be performed on an image frame having a medium resolution, as illustrated in FIG. 4B. The search range and precision may be substantially identical with the search range and precision obtained through the constant cost volume sampling method of FIG. 3. However, this is merely an example, and the search range and precision corresponding to the image scaling being performed on the medium resolution image frame in the dynamic constant volume sampling method may not be exactly identical with those corresponding to the constant volume sampling method. For example, the search range and precision in the constant cost volume sampling method may be identical with those in any one of exemplary embodiments of FIG. 4A to 4C. Since the cost volume size is also five in FIG. 4B, five matching blocks of 2×2 are searched for. The five matching blocks include blocks 1-2, blocks 2-3, blocks 3-4, blocks 4-5, and blocks 5-6.

Figure 4C:
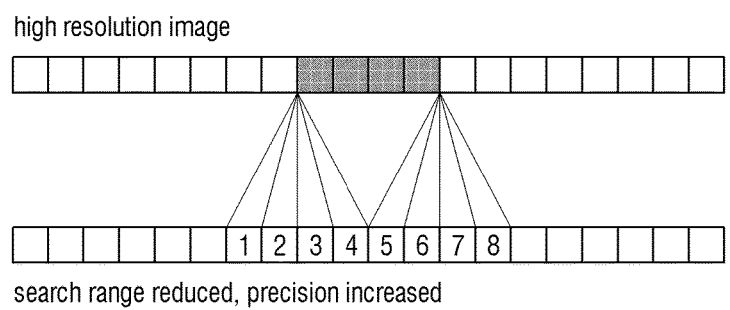

In a case where the disparity value is expected not to be large, that is, the narrow search range is not of concern, the increase in the precision is advantageous to the disparity estimation. Therefore, as illustrated in FIG. 4C, the image scaling may be performed on a high-resolution frame image. Since the cost volume size is five, five matching block corresponding to 4×4 reference block are formed. The five matching blocks include blocks 1-4, blocks 2-5, blocks 3-6, blocks 4-7, and blocks 5-8. The search range is in a range of block 1 to block 8. It can be seen from the comparison among FIGS. 4A to 4C that the precision is highest in FIG. 4C, but the search range is narrowest in FIG. 4C.

The disparity estimator 130 performs a function to estimate the disparity of the image frame using the search range and precision of the matching block determined by the determiner 120. Various methods may be used as the disparity estimation method. For example, the disparity estimator 130 may measure the correlation values between the reference block of the left-eye image (or the right-eye image) and searched matching blocks of the right-eye image (or the left-eye image), and determine the disparity between positions on an x-axis of the matching block having the highest correlation value and the reference block. In another example, the disparity estimator 130 may calculate a cost volume, perform filtering on the cost volume by applying a filter weight, and calculate a disparity map using a result of the filtering. In further another example, stereo matching may be performed using Bayesian belief propagation such as the Markov network.

The image scaling is performed to determine the search range and precision of the matching block according to the resolution of the scaled image frame as described above. To perform the imaging scaling, various methods such as an isomorphic image sampling method and an anamorphic image sampling method may be used.

Figure 5:
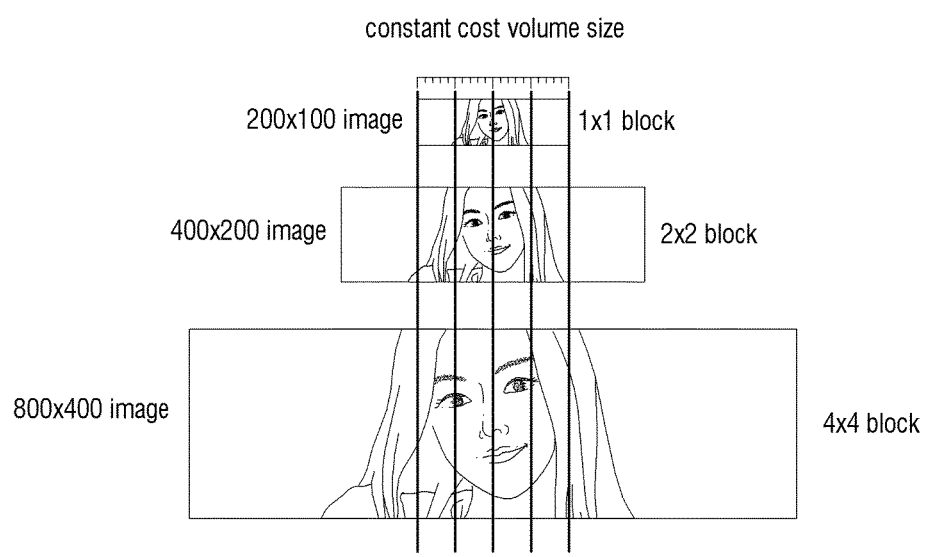
FIG. 5 is a view for explaining an isomorphic image sampling method.

The term "isomorphic" means that a scale of a horizontal axis is equal to that of a vertical axis. Referring to FIG. 5, resolution of an image on an x-axis which is the horizontal axis is 200, 400, and 800 which are increased by two times, and resolution of an image on a y-axis which is the vertical axis is 100, 200, and 400 which are increased by two times corresponding to the increase in the resolution on the x-axis. The image scaling as above is referred to as the isomorphic sampling.

On the other hand, the term "anamorphic" means that a scale of a horizontal axis is different from that of a vertical axis. For example, referring to FIG. 6, resolution of an image on an x-axis which is the horizontal axis is 200, 400, and 800 which are increased by two times, but resolution of an image on a y-axis which is the vertical axis is constant as 100. The image scaling as above is referred to as the anamorphic sampling.

Figure 6:
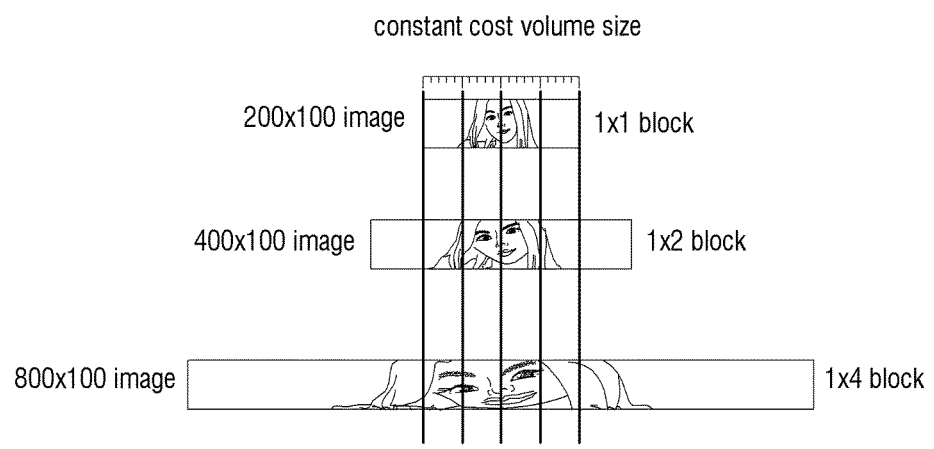
FIG. 6 is a view for explaining an anamorphic image sampling method.

The same effect may be achieved in the anamorphic image sampling as in the isomorphic image sampling because the search range and precision of the matching block are determined by the horizontal resolution of the image frame. Therefore, even in response to the resolution being changed only with respect to the horizontal axis as illustrated in FIG. 6, the same effect as in the image scaling of FIG. 5 may be obtained.

The anamorphic image sampling may be more advantageous than the isomorphic image sampling in that a scale of a block in the vertical direction is not increased, and thus an amount of calculation is reduced. Therefore, the anamorphic image sampling may estimate the disparity with a small amount of calculation as compared with the isomorphic image sampling. This is because the disparity is estimated only based on the distance difference on the x-axis as described above.

The image scaling may be performed by determining resolution for respective frame units. In response to an image frame being a first image frame, the resolution corresponding to the image frame may be determined as the lowest resolution. This is because, in the case where the image frame is the first image frame, searching for a stereo matching point by expanding the search range has a higher priority than searching for a precise matching point by increasing the precision.

In response to the image frame being not the first image frame, a disparity of a previous image frame is analyzed, and then the resolution corresponding to the current frame may be determined. As an example of the disparity analysis method, a disparity histogram may be used. It may be determined whether to change the resolution corresponding to the previous image frame or maintain the resolution corresponding to the previous image frame to be used for the resolution of the current frame.

Figure 7A:
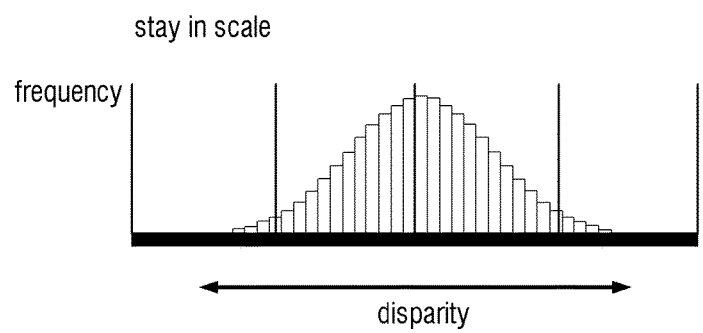
FIGS. 7A and 7B are views for explaining a process of changing resolution using a disparity histogram according to exemplary embodiments.

Referring to FIG. 7A, the disparity histogram used for determining to maintain the resolution scale of the previous image frame is illustrated. In FIG. 7A, an x-axis indicates a disparity value, and a y-axis indicates a disparity frequency. As illustrated in FIG. 7A, a small disparity frequency is represented in an upper ¼ zone and a lower ¼ zone of the disparity histogram, which means that the estimation of the disparity in the resolution of the previous image frame is appropriate. Therefore, the resolution scale of the previous image frame is maintained, and the image scaling is performed based on the resolution of the current image frame being equal to the resolution of the previous image frame.

Figure 7B:
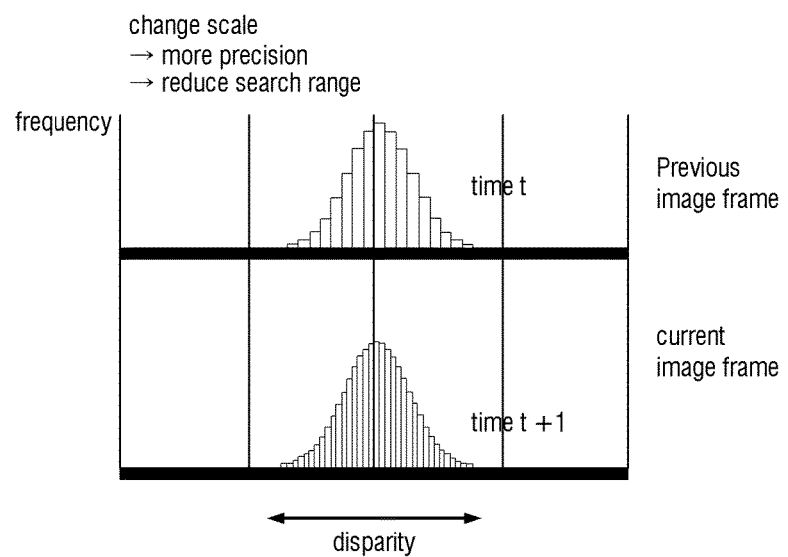

As illustrated in FIG. 7B, the disparity histogram used for determining to increase the resolution scale of the previous image frame, that is, to increase the precision and reduce the search range is illustrated. In FIG. 7B, an x-axis indicates a disparity value, and a y-axis indicates a disparity frequency. As illustrated in FIG. 7B, no disparity frequency is estimated in an upper ¼ zone and a lower ¼ zone of the disparity histogram and all disparity estimation results of the previous image frame are represented in a central portion of the disparity histogram. Thus, reduction in the search range of the block and increase in the precision is advantageous to estimate the disparity. Therefore, the resolution scale is changed, and the image scaling is performed based on the resolution of the current image frame being increased than the resolution of the previous image frame.

Although not shown in drawings, the disparity histogram used for determining to reduce the resolution scale, that is, to increase the search range of the matching block and reduce the precision will be described. In this case, the disparity histogram has a relatively flat shape (i.e., more uniformly distributed with respect to the disparity value). In response to the disparity frequency of a preset threshold or more being represented in an upper ¼ zone and a lower ¼ zone of the disparity histogram, it is determined that the search range needs to be increased. Therefore, the resolution scale is changed, and the image scaling is performed based on the resolution of the current image frame reduced than the resolution of the previous frame.

The screen conversion determiner 140 performs a function to determine where a screen needs to be converted. In response to determination that the screen needs to be converted, the image scaler 110 determines the resolution corresponding to the image frame to the lowest resolution and performs image scaling on the image frame based on the determined resolution. This is because, in the response to the screen being converted, the searching for a stereo matching point by expanding the search range has a higher priority than the searching for a precise matching point by increasing the precision in the case where the image frame is the first image frame. Therefore, in the response to the screen being converted, the image scaler 110 first performs image scaling on the first image frame based on the lowest resolution, and analyzes the estimated disparity value to maintain or change the resolution scale in a next image frame, and continuously perform the image scaling on the next image frame based on the maintained or changed resolution scale. Since the frame is typically provided sixty times per a second, even when the resolution is changed in frame units, the user of the multiview image display apparatus 100 may not feel inconvenience according to the resolution change.

The renderer 150 may perform rendering on a multiview image using the disparity value estimated by the disparity estimator 130 and the depth information. For example, the renderer 150 may select one of a 3D stereoscopic image, that is, the left-eye image and the right-eye image as a reference view (or center view), and generate the leftmost view and the rightmost view which become a basis of the multiview image. The renderer 150 may generate the leftmost view and the rightmost view based on the corrected depth information corresponding to the one of the left-eye image and the right-eye image selected as the reference view. In response to the leftmost view and the rightmost view being generated, the renderer 150 may generate a plurality of interpolation views between the center view and the leftmost view, generate a plurality of interpolation views between the center view and the rightmost view, and perform rendering on the multiview image. However, the exemplary embodiments are not limited thereto, and an extrapolation view generated through an extrapolation method may be generated. The above described operation of the renderer 150 is merely exemplary, and the renderer 150 may perform rendering on the multiview image through various methods other than the above-described operation.

The display 160 performs a function to display the rendered multiview image. The display 160 may include a display panel (not shown) and a viewing area separation unit (not shown) configured to provide multiviews.

The display panel includes a plurality of pixels each of which includes a plurality of sub pixels. The sub pixels may include red (R), green (G), and blue (B) sub pixels. That is, the pixels including the R, G, and B sub pixels are arranged in a plurality of rows and a plurality of columns in the display panel. The display panel displays an image frame. Specifically, the display panel may display the image frame in which a plurality of images having different viewing points from each other are repeatedly arranged in a serial manner.

The viewing area separation unit may be disposed in front of the display panel, and provide different viewing points according to a viewing area, that is, multiview points. The viewing area separation unit may be implemented with a lenticular lens or a parallax barrier.

As an example, the viewing area separation unit may be implemented with the lenticular lens including a plurality of lens areas. The lenticular lens may refract an image displayed on the display panel through the plurality of lens areas. Each of lens areas may be formed to have a size corresponding to at least one pixel, and may differently disperse light penetrating each pixel according to the viewing area.

As another example, the viewing area separation unit may be implemented with the parallax barrier. The parallax barrier may be implemented with a transparent slit array including a plurality of barrier areas. The parallax barrier may block light through a slit between barrier areas, and allow images having different viewing points according to viewing areas to be emitted.

Figure 8:
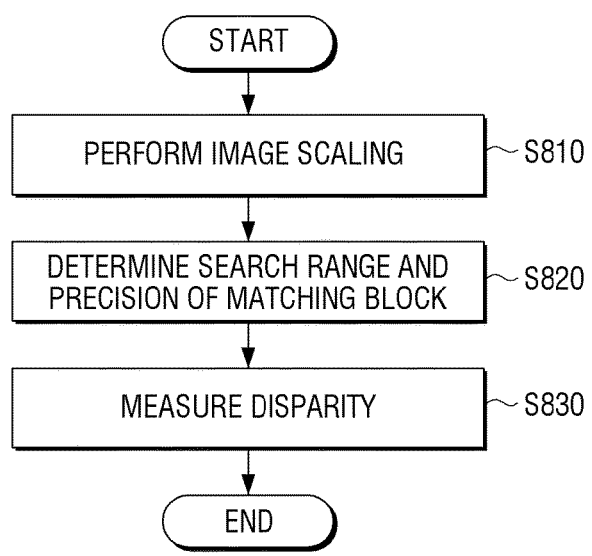
FIGS. 8 and 9 are flowcharts illustrating a disparity estimation method according to exemplary embodiments.

FIG. 8 is a flowchart schematically illustrating a disparity estimation method according to an exemplary embodiment. First, the multiview image display apparatus determines resolution corresponding to an image frame and performs image scaling on the image frame based on the determined resolution (S810). The image scaling method may include an isomorphic image sampling method and an anamorphic image sampling method. The multiview image display apparatus may perform image scaling using one of the isomorphic image sampling method and the anamorphic image sampling method. Since the search range and precision of the matching block are determined only by the resolution in the horizontal direction, the same effect may be achieved in the anamorphic image sampling method as in the isomorphic image sampling while the resolution of the vertical direction is not changed in the anamorphic image sampling method.

Subsequently, the multiview image display apparatus determines the search range and precision of the matching block for an image frame that is scaled according to the resolution corresponding to the image frame (S820). The multiview image display apparatus may determine the search range and precision of the matching block using a preset value of a cost volume size. The value of the cost volume size corresponds to algorithm complexity. Various search ranges and precisions may be obtained through the dynamic cost volume sampling method while maintaining the same algorithm complexity. The search range and precision of the matching block are determined according to the resolution of the scaled image frame. The multiview image display apparatus estimates a disparity of the image frame using the determined the search range and precision of the matching block (S830). For example, the matching blocks may be determined according to the search range and precision, correlation values between a reference block and the matching blocks may be measured, and the disparity may be determined based on a location difference in the horizontal direction between a matching block having the highest correlation and the reference block. However, the disparity estimation method is not limited thereto as described above, and the disparity may be estimated through various different methods.

Figure 9:
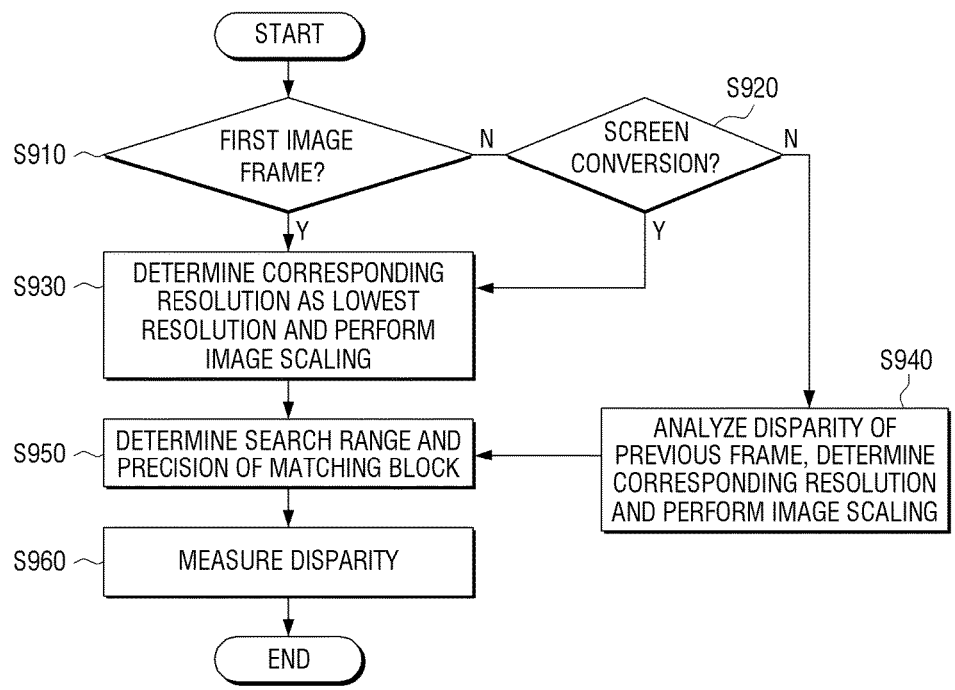

FIG. 9 is a flowchart illustrating a disparity estimation method according to an exemplary embodiment. First, the multiview image display apparatus determines whether an image frame is a first image frame (S910). In response to the image frame being the first image frame (S910-Y), the multiview image display apparatus determines the resolution corresponding to the image frame as the lowest resolution, and perform image scaling on the image frame based on the lowest resolution (S930). This is because, in response to the image frame being the first image frame, the searching for a matching point by expanding the search range is more advantageous than the searching for a precise matching point by increasing the precision.

In response to the image frame being not the first image frame (S910-N), the multiview image display apparatus determines whether a screen is to be converted (S920). In response to determining that the screen is to be converted, it is desirable that the resolution corresponding to the image frame is determined as the lowest resolution. This is because the searching for a matching point by expanding the search range is more advantageous than the searching for a precise matching point by increasing the precision, similar to the case of the image frame being the first image frame. Therefore, in response to determining that the screen is to be converted (S920-Y), the multiview image display apparatus determines the resolution corresponding to an image frame as the lowest resolution, and performs image scaling on the image frame based on the lowest resolution (S930).

In response to determining that the screen is not to be converted (S920-N), the multiview image display apparatus analyzes disparity of a previous image frame, determines resolution based on the analyzed disparity, and performs image scaling based on the determined resolution (S940). The multiview image display apparatus analyzes a disparity histogram of the previous image frame and determines whether to maintain the resolution of the previous image frame or to change the resolution of the previous image frame, for a current image frame. A method of determining whether to maintain or change the resolution according to a distribution pattern of the disparity histogram has been described above, and thus description thereof will be omitted.

The multiview image display apparatus may perform image scaling on the image frame based on resolution determined according to whether the screen is to be converted (S930, S940). Subsequently, the multiview image display apparatus determines the search range and precision of the matching block for the scaled image frame (S950). The multiview image display apparatus may determine the search range and precision of the matching block using the resolution of the image frame and a preset value of a cost volume size. The multiview image display apparatus may estimate a disparity of the image frame using the determined search range and precision of the matching block (S960). Various methods may be used for the disparity estimation as described above.

According to the above-described various exemplary embodiments, a disparity may be estimated using dynamic cost volume sampling in an autostereoscopic 3D display system, and a search range and/or precision may be increased as needed without increasing algorithm complexity. Therefore, an autostereoscopic 3D display may be provided at lower cost.

The disparity estimation methods according to the exemplary embodiments may be implemented as a code and/or instructions of computer program, and provided to the multiview image display apparatus.

As an example, a non-transitory computer-readable medium may store a program for executing the operations of performing image scaling on an image frame based on resolution corresponding to the image frame, determining a search range and precision of a matching block for the scaled image frame according to the resolution corresponding to the image frame, and estimating a disparity of the image frame using the determined search range and precision of the matching block.

The non-transitory computer-recordable medium may not be a medium configured to temporarily store data such as a register, a cache, or a memory but may be a computer-readable medium configured to semi-permanently store data. Specifically, various applications or programs for executing the above described operations may be stored in the non-transitory computer-readable medium such as a compact disc (CD), a digital versatile disc (DVD), a hard disc, a Blu-ray disc, a universal serial bus (USB), a memory card, or a read only memory (ROM). Also, the non-transitory computer-readable recording medium may include a communication medium. The communication medium includes computer-readable commands, a data structure, a program module, and other transmission mechanisms, and includes other information transmission mediums.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method of estimating a disparity in a multiview image display apparatus, the method comprising:
   performing image scaling on a first view image frame included in a plurality of first view image frames and a second view image frame included in a plurality of second view image frames, wherein the scaled first view image frame and the scaled second view image frame have a certain resolution;
   identifying a matching block matching with a reference block of the scaled first view image frame from among a plurality of matching blocks of the scaled second view image frame, by comparing the plurality of matching blocks with the reference block; and estimating a disparity between the first view image frame and the second view image frame, based on a disparity between the reference block and the matching block, wherein an overlapping degree of the plurality of matching blocks varies according to the certain resolution, wherein the first view image frame and the second view image frame are based on a different view, and wherein if the first view image frame is a first image frame among the plurality of first view image frames, the certain resolution is equal to or lower than a resolution for scaling remaining image frames of the plurality of first view image frames.

2. The method as claimed in claim 1, wherein the performing the image scaling comprises:

determining the certain resolution by analyzing a disparity between a previous image frame of the first view image frame and a previous image frame of the second view image frame, if the first view image frame is not the first image frame among the plurality of first view image frames.

3. The method as claimed in claim 2, wherein the determining the resolution comprises:

analyzing the disparity between the previous image frame of the first view image frame and the previous image frame of the second view image frame, by using a disparity histogram, and determining the resolution based on a resolution corresponding to the previous image frame of the first view image frame according to a result of the analyzing.

4. The method as claimed in claim 1, further comprising:

identifying whether a screen is to be converted, wherein the performing the image scaling comprises determining the resolution as being equal to or lower than a resolution for scaling remaining image frames of the plurality of first view image frames based on the screen being converted.

5. The method as claimed in claim 1, wherein the performing the image scaling comprises performing the image scaling by using an anamorphic image sampling method.

6. The method as claimed in claim 1, wherein the identifying the matching block comprises determining a search range and precision of the matching block by using a size of a cost volume.

7. The method as claimed in claim 1, wherein the estimating the disparity of the image frame comprises:

measuring correlation values between the reference block and the plurality of matching blocks, and estimating the disparity between the first and second view image frame, based on a difference between positions of the reference block and the matching block having a highest correlation value.

8. A multiview image display apparatus comprising:

an image scaler configured to perform image scaling on a first view image frame included in a plurality of first view image frames and a second view image frame included in a plurality of second view image frames, wherein the scaled first view image frame and the scaled second view image frame have a certain resolution;

an identifier configured to identify a matching block matching with a reference block of the scaled first view image frame from among a plurality of matching blocks of the scaled second view image frame, by comparing the plurality of matching blocks with the reference block; and a disparity estimator configured to estimate a disparity between the first view image frame and the second view image frame, based on a disparity between the reference block and the matching block, wherein an overlapping degree of the plurality of matching blocks varies according to the certain resolution, wherein the first view image frame and the second view image frame are based on a different view, and wherein if the first view image frame is a first image frame among the plurality of first view image frames, the certain resolution is equal to or lower than a resolution for scaling remaining image frames of the plurality of first view image frames.

9. The multiview image display apparatus as claimed in claim 8, wherein the image scaler is configured to determine the resolution by analyzing a disparity between a previous image frame of the first view image frame and a previous image frame of the second view image frame, if the first view image frame is not the first image frame among the plurality of first view image frames.

10. The multiview image display apparatus as claimed in claim 9, wherein the image scaler is configured to analyze the disparity between the previous image frame of the first view image frame and the previous image frame of the second view image frame by using a disparity histogram, and determine the resolution based on a resolution corresponding to the previous image frame of the first view image frame according to a result of the analyzing.

11. The multiview image display apparatus as claimed in claim 8, further comprising:

a screen conversion identifier configured to identify whether a screen is to be converted, wherein the image scaler is configured to determine the resolution as being equal to or lower than a resolution for scaling remaining image frames of the plurality of first view image frames based on the screen being converted.

12. The multiview image display apparatus as claimed in claim 8, wherein the image scaler is configured to perform the image scaling by using an anamorphic image sampling method.

13. The multiview image display apparatus as claimed in claim 8, wherein the identifier is configured to determine a search range and precision of the matching block by using a size of a cost volume.

14. The multiview image display apparatus as claimed in claim 8, wherein the disparity estimator is configured to measure correlation values between the reference block and the plurality of matching blocks, and estimate the disparity between the first and second view image frame, based on a difference between positions of the reference block and the matching block having a highest correlation value.

15. A non-transitory computer-readable recording medium storing a program comprising instructions, which, when executed by a computer, performs a method of estimating a disparity, the method comprising:

performing image scaling on a first view image frame included in a plurality of first view image frames and a second view image frame included in a plurality of second view image frames, wherein the scaled first view image frame and the scaled second view image frame have a certain resolution;

identifying a matching block matching with a reference block of the scaled first view image frame from among a plurality of matching blocks of the scaled second view image frame, by comparing the plurality of matching blocks with the reference block; and estimating a disparity between the first view image frame and the second view image frame, based on a disparity between the reference block and the matching block,
wherein an overlapping degree of the plurality of matching blocks varies according to the certain resolution,
wherein the first view image frame and the second view image frame are based on a different view, and
wherein if the first view image frame is a first image frame among the plurality of first view image frames, the certain resolution is equal to or lower than a resolution for scaling remaining image frames of the plurality of first view image frames.

* * * * *